United States Patent
Safaee et al.

(10) Patent No.: US 10,756,610 B2
(45) Date of Patent: Aug. 25, 2020

(54) LINEAR INDUCTION MOTOR WITH REDUCED END-EFFECT

(71) Applicant: Bombardier Transportation GmbH, Berlin (DE)

(72) Inventors: Alireza Safaee, Pittsburgh, PA (US); Konrad Woronowicz, Kingston (CA)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 15/657,864

(22) Filed: Jul. 24, 2017

(65) Prior Publication Data

US 2018/0183312 A1 Jun. 28, 2018

(30) Foreign Application Priority Data

Dec. 23, 2016 (CA) ..................................... 2953022

(51) Int. Cl.
*H02K 41/02* (2006.01)
*H02K 41/025* (2006.01)

(52) U.S. Cl.
CPC ................. *H02K 41/025* (2013.01)

(58) Field of Classification Search
CPC ...... H02K 41/025; H02K 41/02; H02K 33/18; H02K 35/04
USPC ............................................ 310/12.22, 12.21
See application file for complete search history.

(56) References Cited

U.S. PATENT DOCUMENTS

| | | | | |
|---|---|---|---|---|
| 3,894,275 A | * | 7/1975 | Baumans ............... | H02K 41/03 310/12.05 |
| 4,912,746 A | * | 3/1990 | Oishi ................... | H02K 41/031 310/12.01 |
| 5,613,188 A | * | 3/1997 | Piech ..................... | H02K 41/03 428/547 |
| 2008/0111430 A1 | * | 5/2008 | Jenny ................... | H02K 41/031 310/12.22 |

FOREIGN PATENT DOCUMENTS

| DE | 102008013692 A1 | * | 9/2009 | ............... B26D 5/00 |
|---|---|---|---|---|
| GB | 2064229 A | * | 6/1981 | ............... H02K 3/28 |

OTHER PUBLICATIONS

Mu Shujun, Chai Jianyun, Sun Xudong, and Wang Shanming, "A Variable Pole Pitch Linear Induction Motor for Electromagnetic Aircraft Launch System", IEEE Transactions on Plasma Science, vol. 43, No. 5, May 2015, pp. 1346-1351.*

(Continued)

*Primary Examiner* — Tulsidas C Patel
*Assistant Examiner* — Robert E Mates
(74) *Attorney, Agent, or Firm* — The Webb Law Firm (57) ABSTRACT

A linear induction motor (LIM) including a primary core extending longitudinally and having a front portion and a rear portion. Coils are mounted on the primary core. The coils include a first set of coils mounted on the front portion and spaced apart from each other by a first pitch. The coils further having a second set of coils, between the first set of coils and the rear portion, which are spaced apart from each other by an industry-standard distance. Each one of the first pitch is greater than the industry-standard distance for reducing an end effect onto the LIM when the LIM travels forward. The first set of coils may have different spaces between its coils and may also include equally spaced coils.

13 Claims, 10 Drawing Sheets

(56) References Cited

OTHER PUBLICATIONS

Sakutaro Nonaka and Tsuyoshi Higuchi, "Design of Single-Sided Linear Induction Motors for Urban Transit", IEEE Transactions on Vehicular Technology. vol. 37. No. 3. Aug. 1988, pp. 167-173.*
Behrens (DE-102008013692-A1) English Translation (Year: 2009).*
Fujii et al., "Simple End Effect Compensator for Linear Induction Motor", IEEE Transactions on Magnetics, Sep. 2002, pp. 3270-72, vol. 38, No. 5, IEEE.
Lee et al., "Exit End Effect Reduction of a Linear Induction Motor for the Deep-underground GTX", XIX ICEM, 2010, IEEE, Rome, Italy.
Guo et al., "A new method to reduce end effect of linear induction motor", Journal of Modem Transportation, Jun. 2012, pp. 88-92, vol. 20, No. 2.

* cited by examiner

FIG. 10

LINEAR INDUCTION MOTOR WITH REDUCED END-EFFECT

CROSS-REFERENCE TO RELATED APPLICATION

This application claims priority to Canadian Patent Application No. 2,953,022 filed Dec. 23, 2016, the disclosure of which is hereby incorporated in its entirety by reference.

BACKGROUND

(a) Field

The subject matter disclosed generally relates to induction motors. More specifically, it relates to linear induction motors.

(b) Related Prior Art

Linear induction motors (LIMs) are becoming more popular given their direct use of electric power to produce motion and, more interestingly, the absence of rotating or moving parts within the motor as for the more widely used rotary motors. Given their shape and the linear movement they naturally produce, linear induction motors have been introduced in the rail industry in order to propel trains.

However, unlike rotary motors, linear induction motors suffer from the "end-effect", which causes motor defluxation and dragging force resulting from the finite length of the motor.

Linear induction motors (LIMs) comprise a primary core, which is a long piece of magnetic material which extends under a train, for example. In practice, the primary is often made of magnetic steel with coils or windings installed therein; the coils are usually inclined (i.e., they have a pitch) and are fitted into slots carved into the primary core. A current is injected into the coils to produce a magnetic field passing through each of the coils according to the laws of electromagnetics.

The LIM is designed so that its primary moves linearly above another long piece of electrically conductive material, known as the secondary core, which is static and extends along a rail track, for example. In practice, the secondary is often made of two layers, one made of aluminum at the top and another made of magnetic iron at the bottom. The electromagnetic interaction between the coils on the primary and the induced current in the secondary propel the primary forward along the secondary. In the railway industry, the secondary is also called a reaction rail. The LIM is the combination of both the primary and the secondary.

When the primary moves forward, one of its ends is the forward portion. The most frontward coils, which generate a magnetic flux, advance over a portion of the secondary in which there was previously no flux. It implies that there is a significant change in the magnetic flux in this portion of the secondary core. The rapid rate of change in the magnetic flux generates eddy currents in the secondary core; these eddy currents further generate, as a counter-effect, a magnetic flux that significantly reduces the original magnetic flux produced by the front coils. Usually, the net total magnetic flux is almost cancelled. After the rapid rise of the eddy current, the eddy current decays. Eddy currents usually decay exponentially, thereby defining a decay time constant $\tau_c$. The magnetic flux generated by the eddy currents also decays accordingly and becomes marginal after a few time constants (e.g., after 3 to 5 $\tau_c$), which implies that the net total magnetic flux at a given location of the secondary is gradually brought back to the level substantially unaffected by the end effect. However, at each location on the secondary over which the primary travels, the "end-effect" has a significant impact on the net magnetic flux at each location.

The magnetic flux that is generated is used to propel the primary forward (thrust) and to provide a vertical force. The thrust is the most significant force to be analyzed when assessing the performance of a train or any similar object using a LIM. Both the thrust and vertical forces are provided by the net magnetic flux.

The end effect described above is more or less significant depending on the length of the primary and on its speed. To determine whether the end-effect is significant, one should compare the duration of the effect (which can be approximated to 3 to 5 $\tau_c$), for example 150 ms, to the time during which the LIM is above a specific location where eddy currents are produced. For example, if the primary is 18 meters long and is propelled at a speed of 30 m/s, it will take 600 ms for the LIM to completely cross a specific location of the secondary. The time during which the end-effect is significant is a quarter of the time of travel of the LIM over that portion of the secondary. The net magnetic flux and the thrust it can generate on the primary of the LIM are thus substantially reduced during a substantial fraction of the time of travel of the primary over this portion of the secondary, and the thrust is therefore significantly reduced to this effect. Since this effect occurs on every portion of the secondary, the performance of the system is greatly reduced.

The secondary core is typically made of a magnetic material such as steel. However, to improve efficiency of the LIM, the secondary core is often made of two different materials: a lower portion of the secondary core is usually made of steel, and called the back iron, which is crowned by a top cap made of a material having a very high electrical conductivity $\sigma_1$, for example aluminum.

To reduce the end effect, one of the contemplated solutions involves changing the material used for the fabrication of the secondary core. By replacing the top cap with a material which has a lower electrical conductivity $\sigma_2 < \sigma_1$, these eddy currents, generated during the transitory period, decay faster because the greater resistivity of the material induces faster dissipation of the eddy currents into heat.

Indeed, the decay time $\tau_c$ is inversely proportional to the resistivity $\rho_1 = 1/\sigma_1$ of the material of the secondary core. Using a material having smaller electrical conductivity means the decay time $\tau_c$ is proportionally reduced. By reducing the decay time of eddy currents of a given factor, the decay time of the magnetic flux produced by the eddy currents against the main magnetic flux from the primary winding can be reduced of the same factor too, thereby mitigating the end-effect on the performance of the LIM. This solution is however not only costly, since it would imply retrofitting the reaction rails of existing transportation systems, but it also decreases the efficiency of the system because changing materials implies a drop in thrust and therefore the performance is reduced. Alternatively, it would imply a redesign of the systems that are not yet built with different materials that could also be more costly that aluminum. These other materials could have some disadvantages over aluminum, such has less interesting mechanical properties or difficult availability.

There is therefore a need to mitigate or reduce the end-effects of a LIM to improve the performance of the LIM.

SUMMARY

According to a first aspect of the invention, there is provided a linear induction motor (LIM). The LIM comprises a primary core extending longitudinally and having sequentially a front portion, an intermediate portion and a rear portion; and coils mounted on the primary core, the coils comprising a first set of coils and a second set of coils. The first set of coils is mounted on the front portion of the primary core, the coils of the first set of coils being spaced apart from each other by a first pitch. The second set of coils being mounted on the intermediate portion of the primary core, the coils of the second set of coils being spaced apart from each other by a second pitch. The first pitch of the first set of coils is greater than the second pitch of the second set of coils for reducing an end effect onto the primary core when the primary core travels forward.

According to an embodiment, the first pitch is a multiple of the second pitch.

According to an embodiment, the first pitch is between 1.2 times the second pitch and 12 times the second pitch.

According to an embodiment, the primary core comprises slots at a surface thereof for mounting the coils.

According to an embodiment, the first pitch is constant.

According to an embodiment, the first pitch is variable.

According to an embodiment, the first set of coils comprises three coils.

According to an embodiment, the coils further comprise a third set of coils mounted on the rear portion, the coils of the third set of coils being spaced apart from each other by a third pitch, wherein the third pitch of the third set of coils is greater than the second pitch of the second set of coils for reducing the end effect onto the primary core when the primary core travels backward.

According to a second aspect of the invention, there is provided a method for reducing an end-effect for a linear induction motor (LIM). The LIM comprises a primary core extending longitudinally and having a front portion and a rear portion. The method comprises providing a first set of coils on the front portion of the primary core, the coils of the first set of coils being spaced apart from each other by a first pitch; and providing a second set of coils between the first set of coils and the rear portion, the coils of the second set of coils being spaced apart from each other by a second pitch. The first pitch of the first set of coils is greater than the second pitch of the second set of coils for reducing an end effect onto the primary core when the primary core travels forward.

According to an embodiment, the first pitch is a multiple of the second pitch.

According to an embodiment, the first pitch is substantially greater than the second pitch.

According to an embodiment, the first pitch is constant.

According to an embodiment, the first pitch is between 1.2 times the second pitch and 12 times the second pitch.

According to an embodiment, the method further comprises providing a third set of coils mounted on the rear portion of the primary core the third set of coils being spaced apart from each other by a third pitch, wherein the third pitch of the third set of coils is greater than the second pitch of the second set of coils for reducing the end effect onto the primary core when the primary core travels backward.

According to a third aspect of the invention, there is provided a linear induction motor (LIM). The LIM comprises a primary core extending longitudinally and having a front portion and a rear portion; and coils mounted on the primary core, the coils comprising a first set of coils and a second set of coils. The first set of coils is mounted on the front portion of the primary core, the coils of the first set of coils being spaced apart from each other by a first pitch. The second set of coils being mounted on the primary core between the first set of coils and the rear portion, the coils of the second set of coils being spaced apart from each other by a second pitch. The first pitch is greater than the second pitch for reducing an end effect onto the primary core when the primary core travels forward.

According to an embodiment, the first pitch is a multiple of the second pitch.

According to an embodiment, first pitch is substantially greater than the second pitch.

According to an embodiment, the first pitch is between 1.2 times the second pitch and 12 times the second pitch.

According to an embodiment, the coils further comprise a third set of coils mounted on the rear portion, the coils of the third set of coils being spaced apart from each other by a third pitch, wherein the third pitch of the third set of coils is greater than the second pitch of the second set of coils for reducing the end effect onto the primary core when the primary core travels backward.

According to an embodiment, the first pitch is constant.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

There is described a linear induction motor (LIM) comprising a primary core extending longitudinally and having a front portion, an intermediate portion and a rear portion.

Coils are mounted on the primary core. The coils comprise a first set of coils mounted on the front portion and having a first pitch (distance between two corresponding points on adjacent coils). The coils further comprise a second set of coils, mounted on the intermediate portion and having a second pitch smaller than the first pitch and typically similar to the pitch used in prior art primary coils. The first pitch is larger than the typical pitch used in the industry, allowing the decrease of an end effect onto the LIM when the LIM travels forward. The first set of coils may have different spaces between its coils and may also include equally spaced coils.

Figure 4:
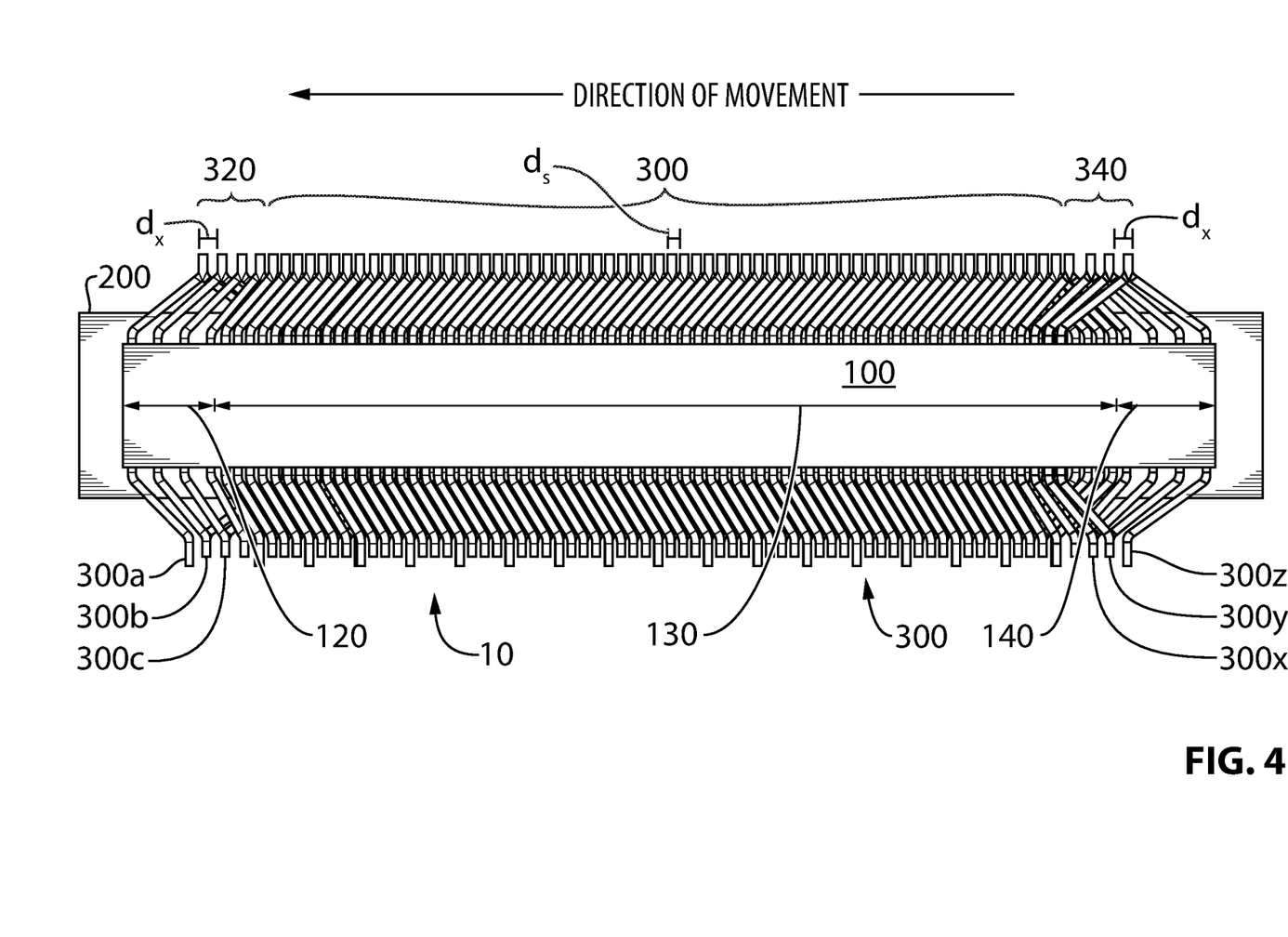
FIG. 4 is a top view illustrating a LIM with coils having increased spacing at both ends of the LIM, according to an embodiment.
Figure 10:
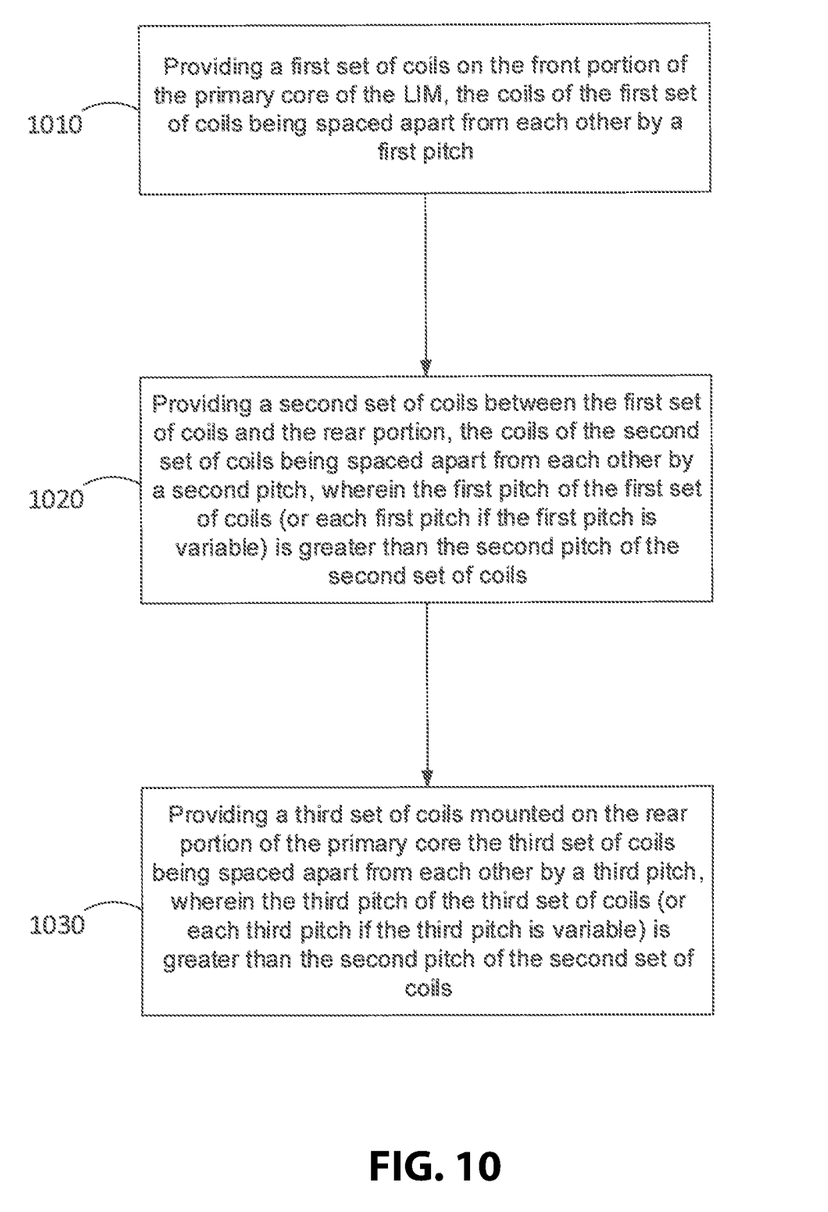
FIG. 10 is a flowchart illustrating a method for reducing an end-effect for a LIM, according to an embodiment.

As will be apparent further below, there is shown in FIGS. 4 and 10 a linear induction motor (LIM) 10 comprising a primary core 100 extending longitudinally and having a front portion 120, an intermediate portion 130 and a rear portion 140. Coils 300 are mounted on the primary core 100. The coils 300 comprise a first set of coils 320 mounted on the front portion 120 and spaced apart from each other by a first pitch. The coils 300 further comprise a second set of coils 330, on the intermediate portion 130, spaced apart from each other by a standard distance. The first pitch is greater than the second pitch for reducing an end effect impact onto the LIM 10 when the LIM 10 travels forward.

Figure 1:
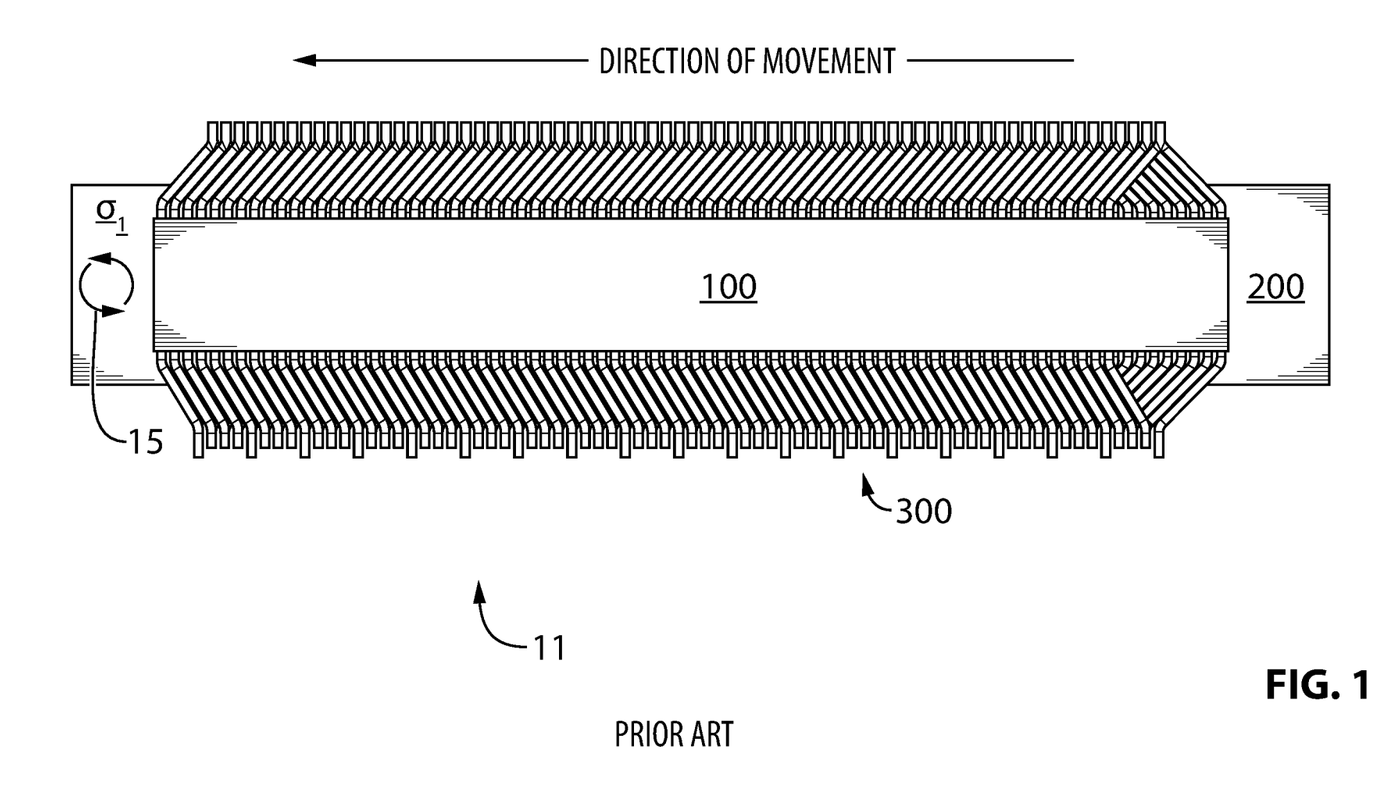
FIG. 1 is a top view illustrating a linear induction motor (LIM) producing eddy currents in a secondary core, according to the prior art.
Figure 3:
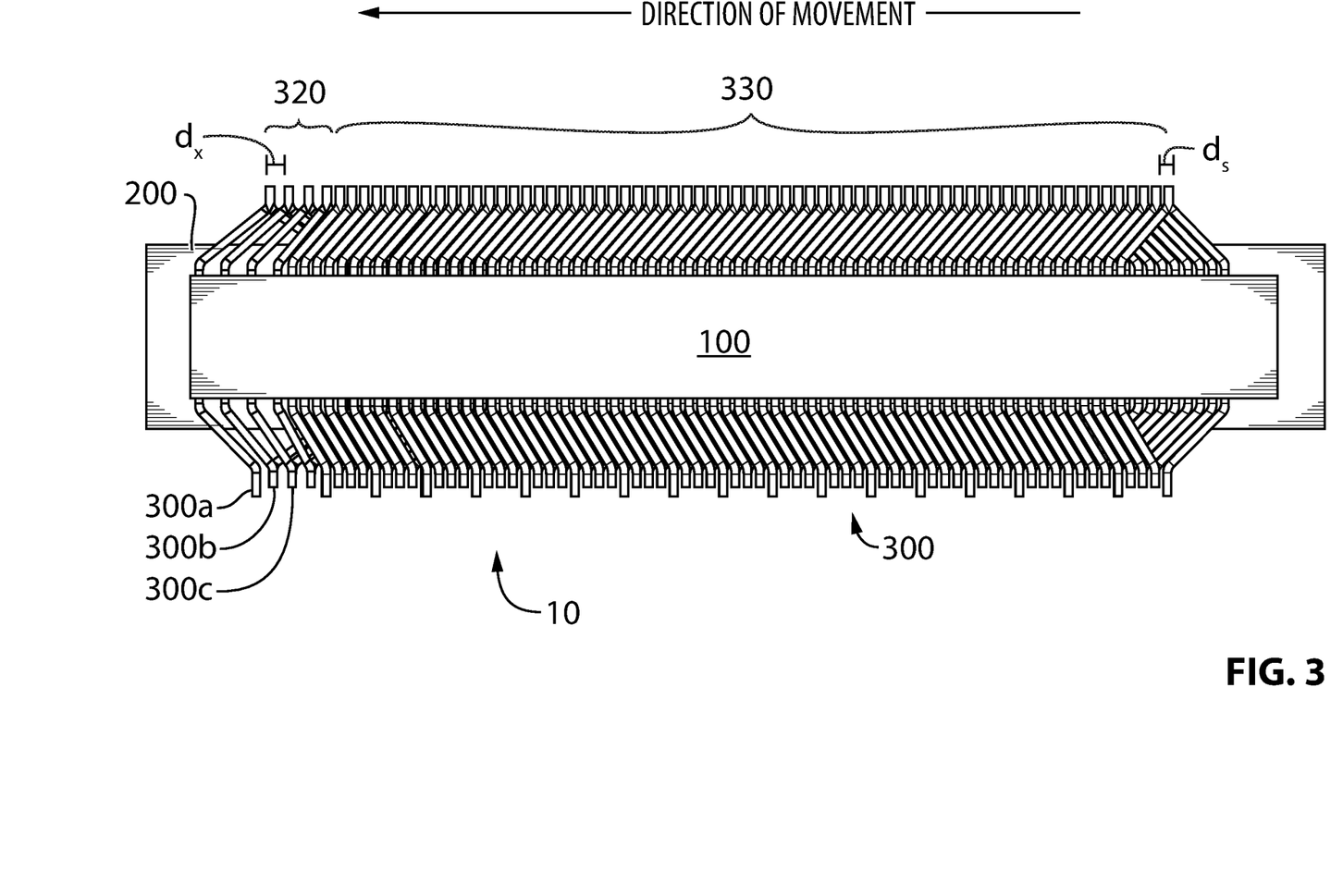
FIG. 3 is a top view illustrating a LIM with coils having increased spacing at the front end of the LIM, according to an embodiment.

Prior to thoroughly describing FIGS. 3-4, it is referred to FIG. 1 which illustrates a linear induction motor (LIM) 11 according to the prior art. The primary core 100, secondary core 200 and coils 300 are shown.

Figure 8:
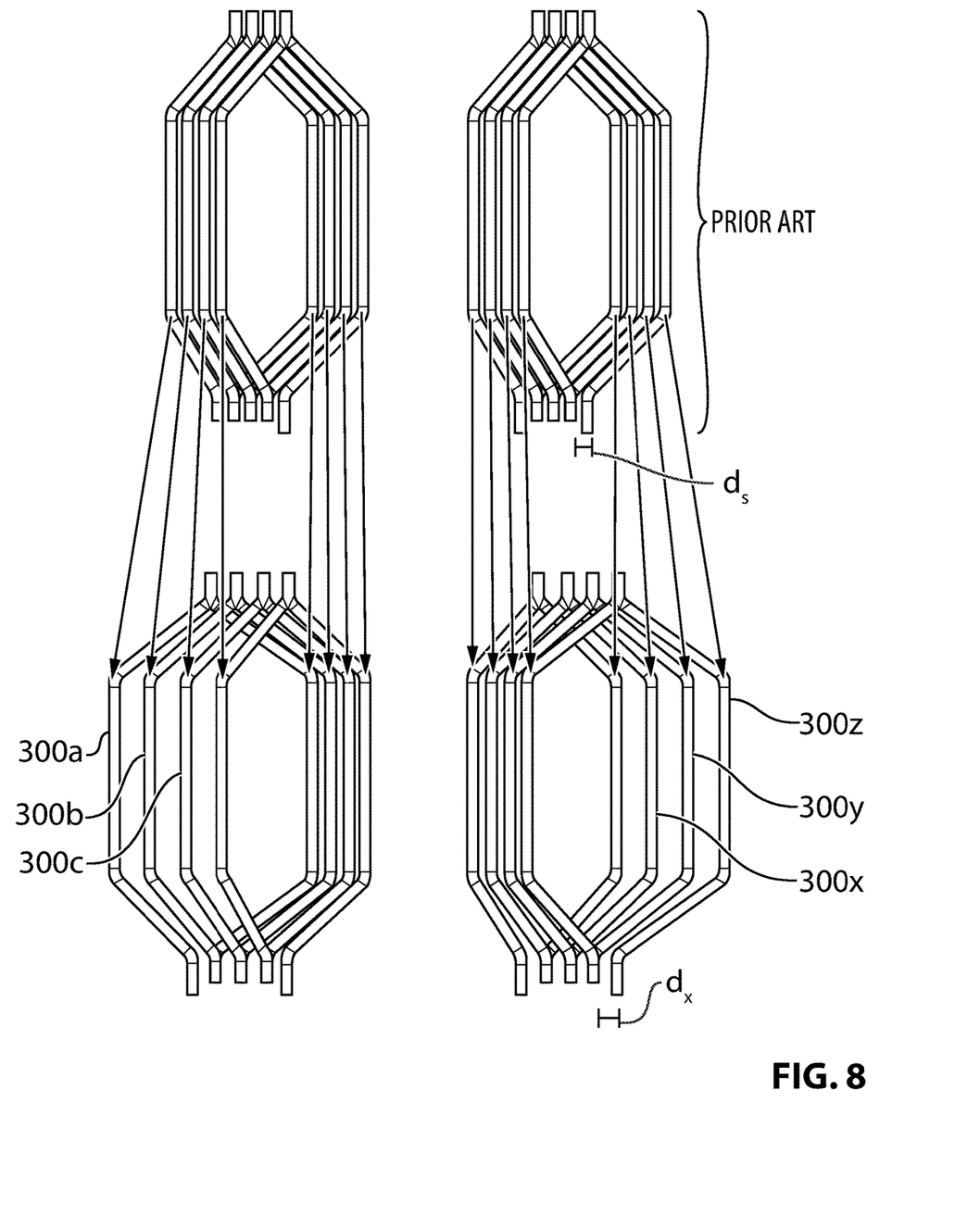
FIG. 8 is a comparative top view illustrating an embodiment of sets of front and rear end coils of both LIMs of FIG. 7.

The coils 300, also known as windings, are electric wiring having a substantially circular or polygonal shape; the second end of the coil is usually connected to the first end of another coil to make up a plurality of coils 300 electrically connected in series, as shown in FIG. 8. A power source feeds electrical power to the free ends of the extremal coils, (i.e., the first (frontward) coil 300a or the last (rearward) coil 300z) of each of the three phases at one end of the primary core 200, while the opposite extremities of the coils of each phase are bound together to form a star connection so they can generate a magnetic flux.

Figure 2:
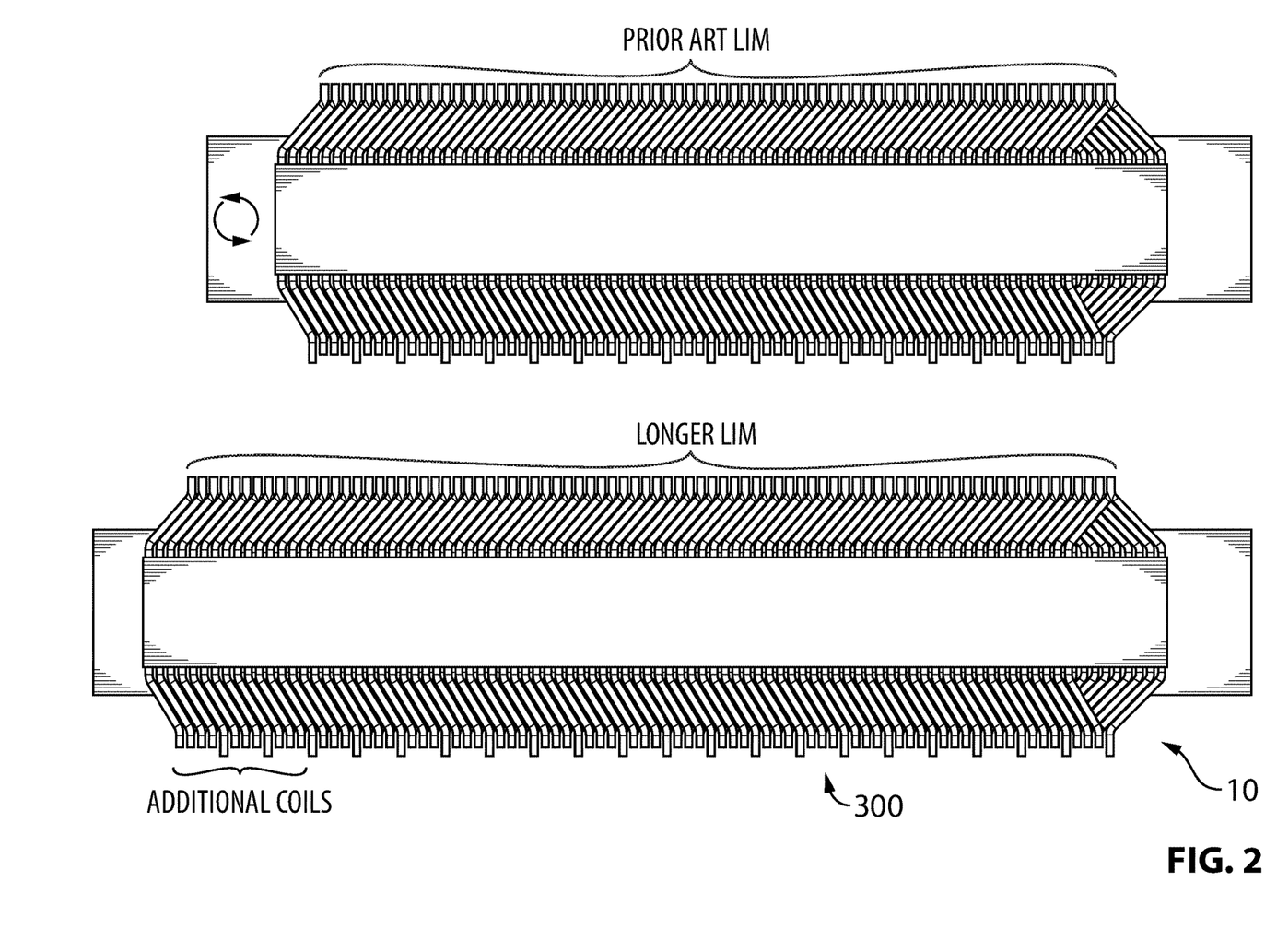
FIG. 2 is a comparative top view illustrating an embodiment of an extended LIM with additional coils in comparison with a LIM according to the prior art.

Eddy currents 15 occurring by the front of the LIM 11, with their magnetic flux opposing the magnetic flux of the coils, are illustrated in FIGS. 1 and 2.

Now referring to FIG. 4, there is shown an embodiment of the LIM 10 in which the coils 300 of the first set of coils 320 at the front portion 120 are more widely spaced apart than the other coils in the intermediate portion 130. Because the first, second and third frontward coils 300a, 300b and 300c reach further ahead than if they had the same pitch as that of the second set of coils 330, this configuration introduces a negative time offset in the triggering of the end-effect which, accordingly, allows the decay of the end-effect to start earlier. The end-effect is not reduced in intensity but since it occurs earlier with respect to the passage of most of the primary, it is less deleterious for the performance of the LIM 10.

For example, one, two or three of the most frontward coils (respectively coils 300a, 300b, 300c), belonging to the first set of coils 320 mounted at the front portion 120, can be spaced more widely than the coils 300 of the second set of coils 330 which are spaced by $d_s$, i.e., spaced by a first pitch $d_x$. These frontward coils 300a, 300b, 300c serve as sacrificial coils which produce less thrust as they are affected by the eddy currents 15.

In case the LIM 10 is designed to travel in both directions, the same reasoning can be applied, symmetrically, with the most rearward coils 300z, 300y, 300x, defining a third set of coils 340 at the rear portion 140, when the primary 100 is moving in the opposite direction. The coils of the third set of coils 340 can be spaced more widely than the coils 300 of the second set of coils 330, i.e., spaced by a third pitch $d_x'$, which can be similar to or different from the first pitch $d_x$, but larger than the second pitch $d_s$. All the coils 300 of the second set of coils 330 are separated by the second pitch $d_s$. The coils 300 of the second set of coils 330 outnumber the first and third set of coils 320, 340. The coils 300 of the second set of coils 330 are mounted on the intermediate portion 130 of the primary core 100, i.e., sequentially between the front portion 120 and the rear portion 140, as shown in FIG. 4.

Upon forward displacement of the primary 100 and therefore of the most frontward coil 300a, the magnetic flux of the first frontward coil 300a generates a response in the secondary core 200 that reacts by causing a magnetic flux that partially cancels the magnetic flux of the first frontward coil 300a. The thrust generated by the first frontward coil 300a on the primary is therefore substantially reduced. In this sense, the first frontward coil 300a can be said to be a "sacrificial coil".

However, even though the first frontward coil 300a is irremediably affected by the end-effect, the following coils 300 right after the first frontward coil 300a, such as the second frontward coil 300b and the third frontward coil 300c, are decreasingly affected to a degree that varies depending on the design of the LIM 10, and especially of the first pitch $d_x$.

Indeed, the end-effect at a given location on the secondary core 200 decays as an exponential function over time, whether or not there are other coils 300 passing thereby. In other words, the end-effect does not decrease as a function of the number of coils 300 which move over a given spot on the secondary core 200.

The embodiment shown in FIG. 4 takes advantage of this behavior by spatially spreading the coils 300 located at the front portion 120 of the primary 100. This frontward spreading is performed longitudinally and comprises increasing the distance between two adjacent coils up to the first pitch $d_x$ that is significantly greater than the second pitch $d_s$ spacing the coils 300 in the second set of coils 330 mounted on the intermediate portion 130 of the primary 100. The spreading refers to lengthening the distance of a coil (e.g., coil 300a) with respect to another adjacent coil (e.g., coil 300b), which is enlarged compared to the usual distance, i.e., $d_x > d_s$ as shown in FIGS. 3-4 and 7-8. In other words, this means increasing the first pitch $d_x$. The first pitch $d_x$ may be increased by "stretching" the coils 300 of the first set of coils 320, and/or of the third set of coils 340, so that they are longer than the coils 300 of the second set of coils 320 and therefore reach farther in the longitudinal direction of the primary core 100.

Figure 5:
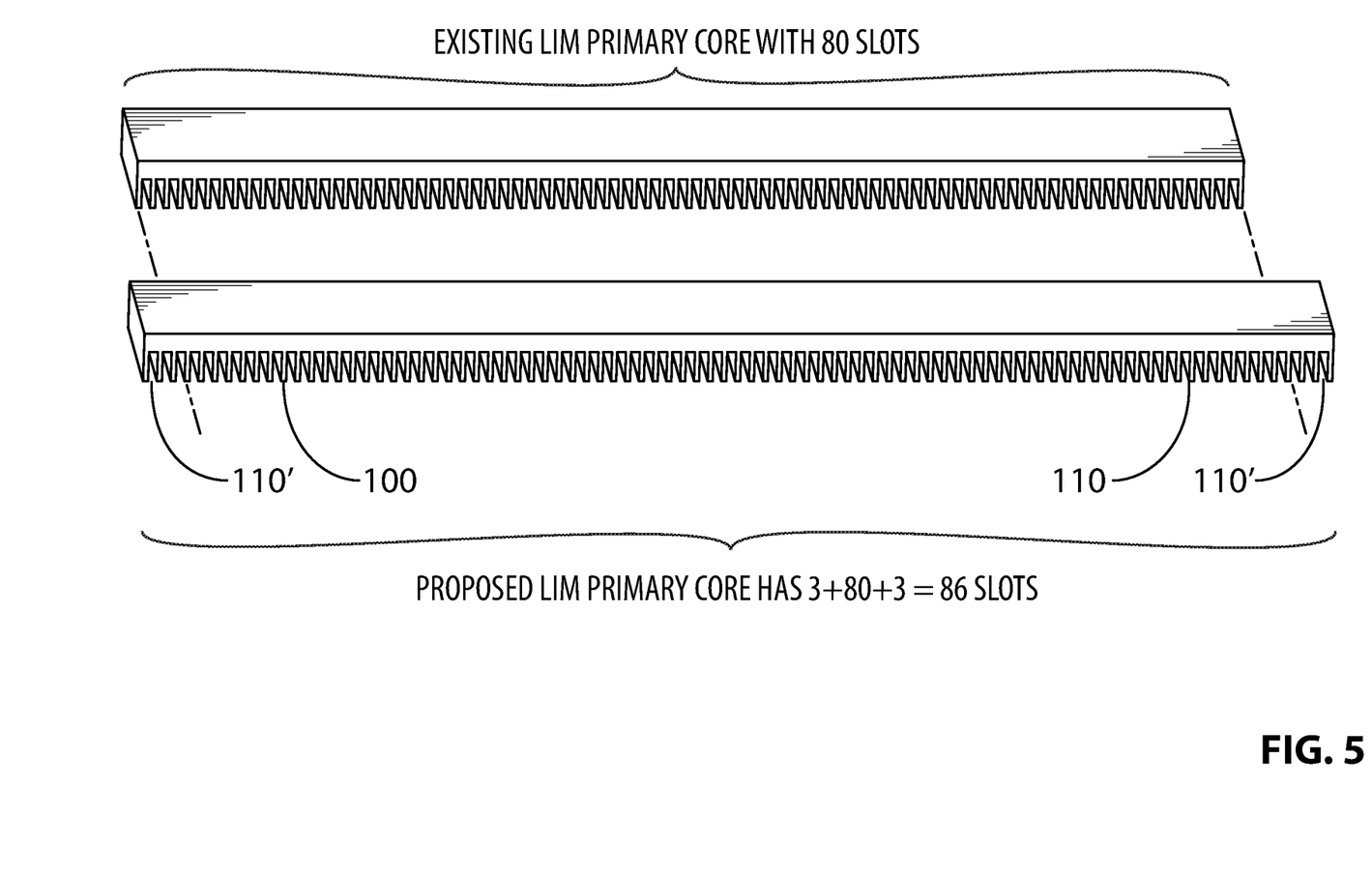
FIG. 5 is a comparative perspective view illustrating an embodiment of a primary core having additional slots at both ends thereof, in comparison with a primary core according to the prior art.

In order to make this spreading effective, the addition of slots to the primary core 100 can be contemplated, as shown in FIG. 5. Indeed, prior art primary cores usually include slots 110 which are fabricated over their surface. More specifically, primary cores are an assembly of parallel sheets of steel stacked one against the other. These sheets of steel are first cut out of a blank sheet of steel in their final desired shape (including the outline, the slots and the holes for the through bolts) and then stacked. They are held together by bolts passing through the sheets. These slots 110 are large enough so that a portion of the coils 300 can be fitted therein so that the coils 300 hold in place with the desired spatial configuration, including pitch. There are normally as many slots 110 as there are coils 300 to be installed on the primary core 100.

FIG. 5 shows that additional slots 110' can be provided at the forward end of the primary core 100, i.e., in the front portion 120. By comparing FIG. 4 and FIG. 5, it will be understood that some of the additional slots 110' are unused (even the extremal existing slots 110 can be unused). The purpose of these unused slots is to provide additional spacing (or spatial separation, or pitch) between adjacent but more widely spaced coils 300 close to the forward end of the LIM 10. Skipping slots (110, 110') provides the additional spacing. In this case, the distance between some of the most frontward coils (300a, 300b, 300c) is a multiple (e.g. integer of two or more) of the spacing $d_s$ between slots in the intermediate portion 130.

Even though FIG. 5 shows the addition of slots 110' having the same spacing $d_s$ as the other slots 110. This embodiment is convenient because it implies only lengthening the primary core 100 with the same fabrication process (i.e., exactly the same size and configuration of the slots 110, including their spacing).

Figure 6:
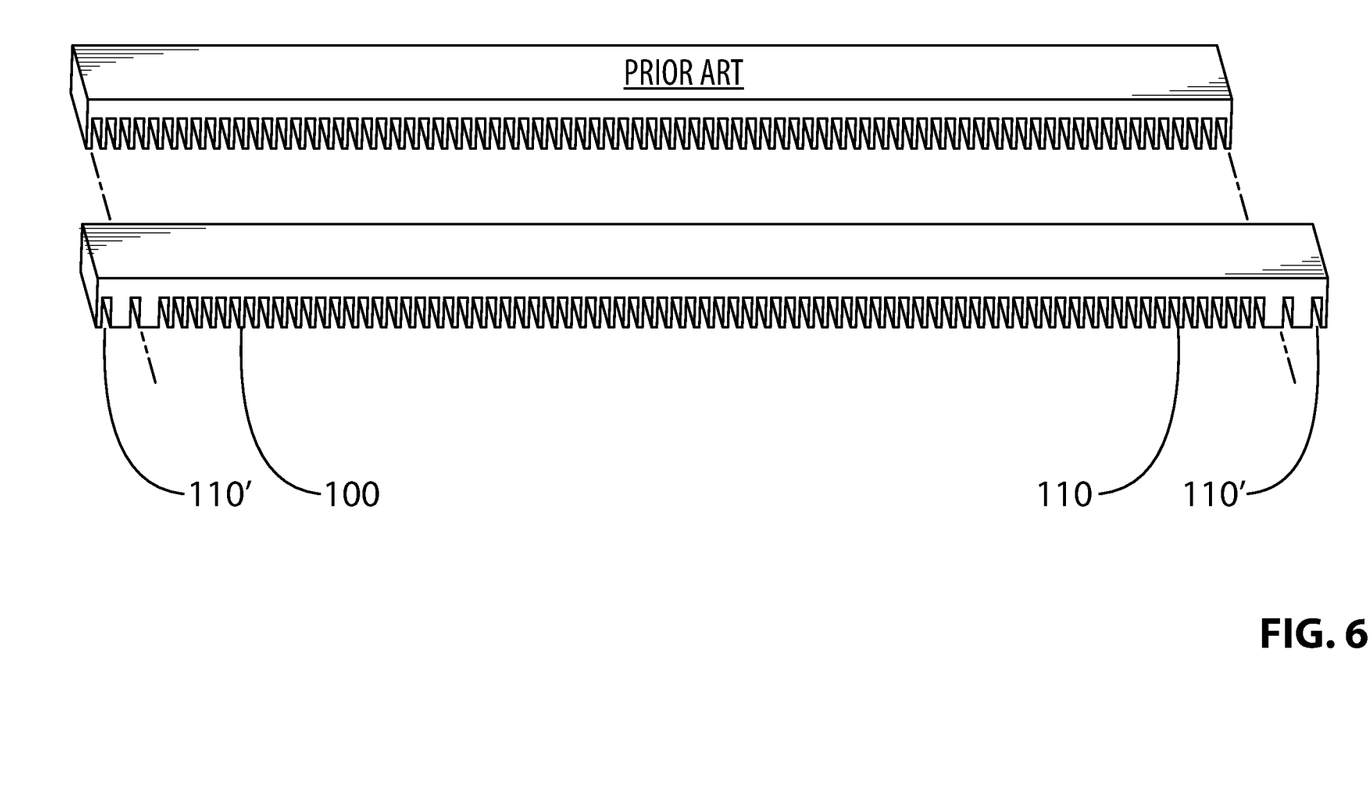
FIG. 6 is a comparative perspective view illustrating another embodiment of a primary core having increased spacing at both ends thereof, in comparison with a primary core according to the prior art.
Figure 7:
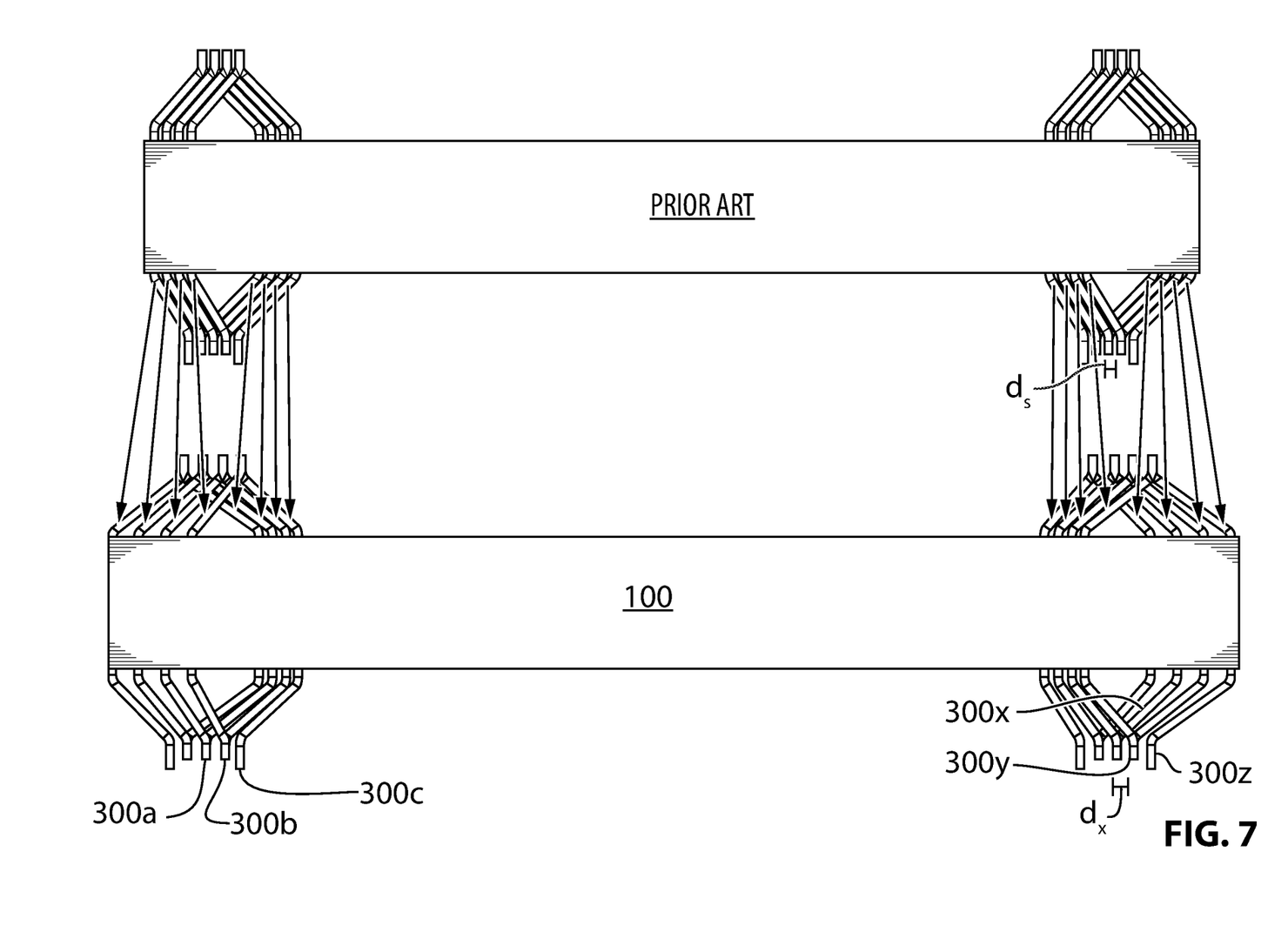
FIG. 7 is a comparative top view illustrating an embodiment of a LIM (most coils omitted for clarity) having coils with increased spacing at both ends thereof, in comparison with a LIM according to the prior art.

However, other types of slot configurations can be contemplated. For example, the additional slots can be provided on the primary core 100 with any other spacing, as needed. The spacing may therefore be different from the usual spacing between the slots 110 of the intermediate portion 130, as shown in FIG. 6. In this case, having unused slots as shown in FIG. 5 can also be avoided since the slots 110' may be fabricated only where needed. For example, FIG. 6 shows such an embodiment where the additional slots themselves are more widely spaced (spacing $d_x$, as required for the frontward coils 300a or 300b, held in place by these additional slots 110'), thereby avoiding unused slots as in FIG. 5.

It should be noted that there is a limit to the additional spacing that can be given to the first frontward coil 300a, the second frontward coil 300b and the third frontward coil 300c. The limit is the spacing available for the motor length. This is due to restrictions in both the static and dynamic mechanical envelopes.

Also, the spacing that is too long would not be effective so another limit is strictly depending on diminishing returns. This limit is the pole pitch. Indeed, the coils 300 are provided in groups of coils forming poles provided periodically. There are three different poles corresponding to the three phases of the electric power provided to the LIM 10. The pole pitch is the distance between two closest groups of coils of the same pole. For example, in the embodiment shown in FIG. 4, the pole pitch in the second set of coils 330 is 12 times the pitch $d_s$ of the second set of coils 330. Therefore, the first pitch $d_x$ needs to be smaller than the pole pitch, which translates to smaller than $12*d_s$ in this embodiment, where $d_s$ is the second pitch. It should be noted that this is a limit, and that dx needs to be comprised between substantially more than ds and $12*d_s$, or between $1.2*d_s$ and $12*d_s$, or between $1.5*d_s$ and $12*d_s$; preferably between substantially more than ds and $9*d_s$, or between $1.2*d_s$ and $9*d_s$, or between $1.5*d_s$ and $9*d_s$; more preferably between $1.2*d_s$ and $4*d_s$, or between $1.5*d_s$ and $4*d_s$; or about $2*d_s$, for example.

By having the coils 300 extending further away from the intermediate portion in the forward direction, the end-effect occurs earlier. By the time the second set of coils 330 of the intermediate portion 130 pass by a given location on the secondary core 200, the eddy currents 15 will have had time to decay and will be effectively reduced. The coils 300 of the intermediate portion 130, which provide the major portion of the thrust, therefore generate their thrust in more performant circumstances since the end-effect was triggered earlier due to the increased spacing of the extremal coils (300a, 300b). Therefore, a greater number of coils 300 can act without being significantly adversely affected by the end-effect.

If necessary, the increased spacing within the first set of coils 320 does not need to be equal between each coil, or does not need to have the same values as in the third set of coils 340. For example, the first spacing (between the first frontward coil 300a and the second frontward coil 300b) would be $d_{x1}$. The second spacing (between the second coil 300b and the third coil 300c) would be $d_{x2}$. It would be advantageous to have $d_{x1}>d_s$ and $d_{x2}>d_s$, but having $d_{x1}=d_{x2}$ (constant pitch within the first set of coils 320) may not be necessary and having different values for $d_{x1}$ and $d_{x2}$ is therefore also possible (variable pitch within the first set of coils 320). This may also be extended to both the front portion 120 and rear portion 140: although both front and rear portions 120, 140 are shown as symmetrical, the larger spacing on each end does not have to be the same in the front and rear. It may however be the same if the LIM 10 is bidirectional and travels at the same speed in both directions. Moreover, the first pitch and the second pitch do not have to be constant. The first pitch and the second pitch may be variable. The first pitch could increase (i.e. the spacing between each coil 300 of the first set of coils 320 increases) the closer the coils 300 are located from the front end of the primary core 100. Although the first pitch may vary, it remains larger than the second pitch.

More generally, the linear density of coils 300 in the longitudinal direction of the LIM 10 (i.e., number of coils per unit of distance, which is inversely proportional to the spacing or pitch) is kept constant for the coils 300 in the intermediate portion 130, and is reduced at the front portion 120 and optionally at the rear portion 140. This reduced coil density for at least one end of the LIM 10 can be constant or variable between each of the extremal coils, i.e., the distances between coils 300a, 300b and 300c, or between 300z, 300y and 300x, can be the same or can be variable. Keeping the coil linear density high where the end-effect has substantially decayed, and lower where the end-effect is still present, contributes to the overall performance of the LIM 10.

Figure 9:
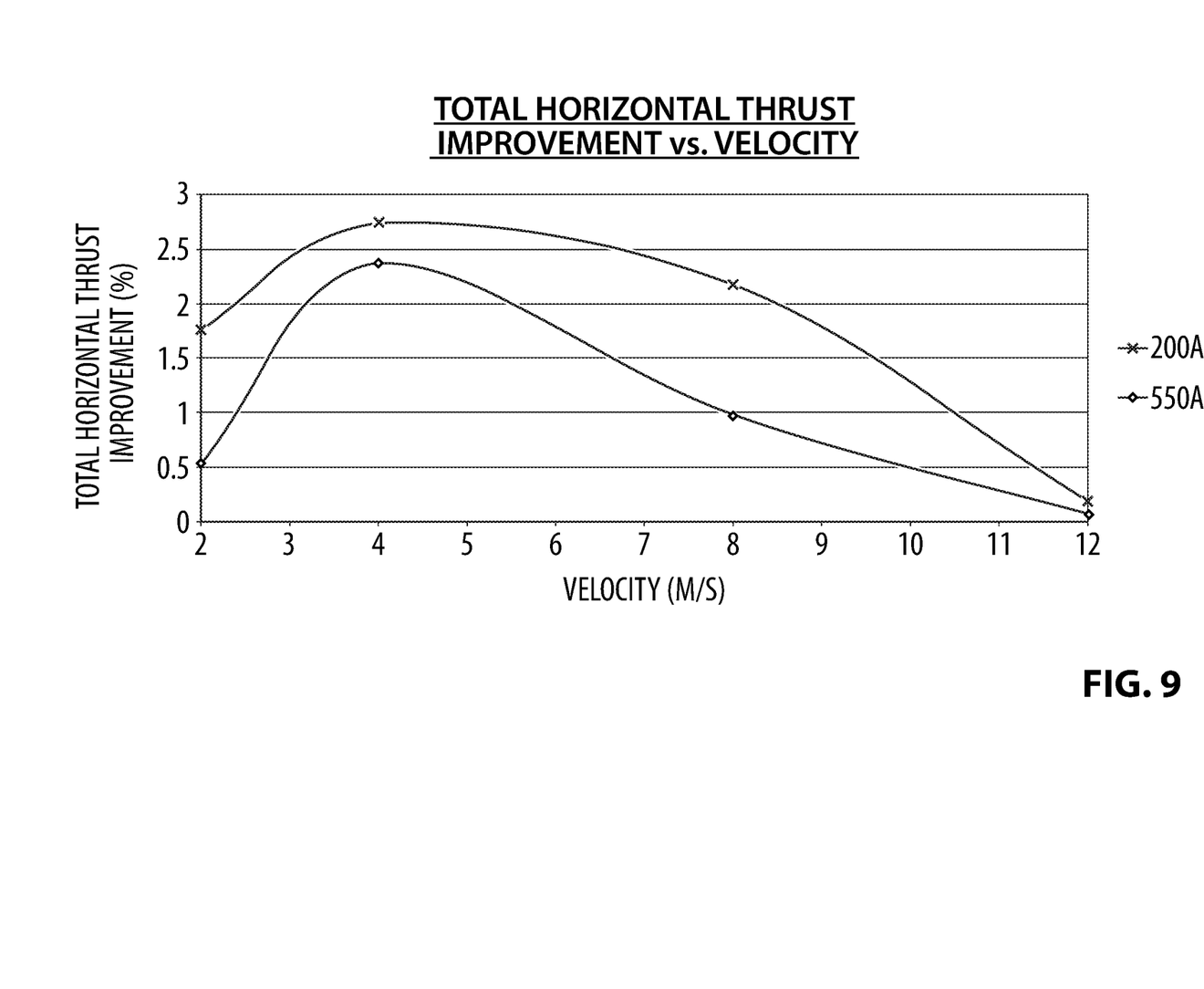
FIG. 9 is a graph illustrating relative thrust improvement, for different currents and as a function of speed, for an embodiment of an extended-spacing end coils LIM in comparison with a prior-art LIM.

FIG. 9 illustrates the percentage of gain in thrust as a function of speed of an improved LIM 10 having increased coil spacing in its front and rear portions 120, 140 over a standard LIM having the same quantity of coils, but constantly spaced.

It will be noticed that the improvement in thrust is measurable and significant. The gains as a function of speed are illustrated for two current levels, the largest gains being provided at a lower current setting. For a given setting, there exists a speed where the improvement is greatest: in the examples shown in FIG. 9, this speed is in the order of 4 m/s. This optimal speed may be different with different parameters. The improvement in thrust is relatively smaller at higher currents. In the experimental setting for the graph of FIG. 9, the air gap between the primary core 100 and secondary core 200 is a 9 mm gap.

It should be noted that the impact of the end-effect is the greatest at the front end (e.g., front portion 120) of the primary core 100 i.e., the end that is on the forward side of the moving primary. However, a rear end-effect is also present and causes an undesirable dragging force, although with a smaller intensity than the front end-effect. Providing a greater pitch between extremal coils 300 is therefore more advantageous at the front portion 120 and can be performed only at the front portion 120, as shown in FIG. 3. However, for improving performance, the increased pitch can also be used at the rear portion 140 of the primary core 100, as shown in FIGS. 4-8.

Referring to FIG. 10, there is shown a method for reducing an end-effect for a linear induction motor (LIM). The LIM comprises a primary core extending longitudinally and having a front portion and a rear portion. The method comprises, in step 1010, providing a first set of coils on the front portion of the primary core, the coils of the first set of coils being spaced apart from each other by a first pitch; and, in step 1020, providing a second set of coils between the first set of coils and the rear portion, the coils of the second set of coils being spaced apart from each other by a second pitch. The first pitch of the first set of coils is greater than the second pitch of the second set of coils for reducing an end effect onto the primary core when the primary core travels forward. The method further comprises, in step 1030, providing a third set of coils mounted on the rear portion of the primary core the third set of coils being spaced apart from each other by a third pitch, wherein the third pitch of the third set of coils is greater than the second pitch of the second set of coils for reducing the end effect onto the primary core when the primary core travels backward.

Moreover, the increased pitch of extremal coils with respect to coils 300 of the intermediate portion 130 has the advantage of not introducing additional voltage losses as would occur if coils were added without having an increased pitch, as shown in FIG. 2. In that case, the LIM 10 will have increased thrust because it is longer (i.e., the LIM 10 of FIG. 2 does not have the same motor rating as the one in FIG. 1), but the end-effect will not be reduced. The LIM 10 of FIG. 4 has the same motor rating as the one in FIG. 1, but the end-effect is addressed and there are no additional voltage losses as those reducing the performance of the LIM 10 of FIG. 2.

If the LIM 10 is bidirectional (i.e., to be used in both directions), for example on a train, the ends can be a front portion 120 or a rear portion 140 depending on the direction of travel. Therefore, providing a greater pitch between extremal coils at both ends (front and rear portions 120, 140) of the LIM 10 is a sensible choice. This is why FIGS. 4-8 illustrating the LIM 10 show increased pitch at both ends (i.e., front portion 120 and rear portion 140), even though the increased pitch could also have existed at only one end. The coils 300z, 300y and 300x in the rear portion 140 are analogous to the coils 300a, 300b and 300c (respectively) in the front portion 120. The coils 300z, 300y and 300x, if separated by $d_x$ instead of $d_s$, form the third set of coils 340 mounted on the rear portion 140.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A multi-phase linear induction motor (LIM) comprising:
   a primary core extending longitudinally and having sequentially a front portion, an intermediate portion and a rear portion; and
   coils mounted on the primary core, the coils comprising a first set of coils, a second set of coils, and a third set of coils;
   the first set of coils including coils of each phase of the multi-phase LIM being mounted on the front portion of the primary core, wherein adjacent coils of the first set of coils are all spaced apart from each other by a first pitch which is constant along the first set of coils;
   the second set of coils including coils of each phase of the multi-phase LIM being mounted on the intermediate portion of the primary core, the coils of the second set of coils being spaced apart from each other by a second pitch; and
   the third set of coils including coils of each phase of the multi-phase LIM being mounted on the rear portion, wherein adjacent coils of the third set of coils are all spaced apart from each other by a third pitch which is constant along the third set of coils;
   wherein the first pitch of the first set of coils is greater than the second pitch of the second set of coils for reducing an end effect onto the primary core when the primary core travels forward, wherein the third pitch of the third set of coils is greater than the second pitch of the second set of coils for reducing the end effect onto the primary core when the primary core travels backward, wherein the primary core includes slots in the front, intermediate, and rear portions thereof for mounting the coils, wherein a coil of the first set of coils that is closest to the second set of coils is also spaced the first pitch from the second set of coils, and a coil of the third set of coils that is closest to the second set of coils is also spaced the third pitch from the second set of coils.

2. The multi-phase LIM of claim 1, wherein the first pitch and/or the third pitch are a multiple of the second pitch.

3. The multi-phase LIM of claim 1, wherein the first pitch and/or the third pitch are between 1.2 times the second pitch and 12 times the second pitch.

4. The multi-phase LIM of claim 3, wherein the first set of coils comprises three coils.

5. A method for reducing an end-effect for a multi-phase linear induction motor (LIM) comprising a primary core extending longitudinally and having a front portion and a rear portion; the method comprising:
   providing a first set of coils, including coils of each phase of the multi-phase LIM, on the front portion of the primary core, wherein adjacent coils of the first set of coils are all spaced apart from each other by a first pitch which is constant along the first set of coils;
   providing a third set of coils, including coils of each phase of the multi-phase LIM, mounted on the rear portion of the primary core, wherein adjacent coils of the third set of coils are all spaced apart from each other by a third pitch which is constant along the third set of coils; and
   providing a second set of coils, including coils of each phase of the multi-phase LIM, between the first set of coils and the third set of coils, the coils of the second set of coils being spaced apart from each other by a second pitch;
   wherein the first pitch of the first set of coils is greater than the second pitch of the second set of coils for reducing an end effect onto the primary core when the primary core travels forward, wherein the third pitch of the third set of coils is greater than the second pitch of the second set of coils for reducing the end effect onto the primary core when the primary core travels backward, wherein a coil of the first set of coils that is closest to the second set of coils is also spaced the first pitch from the second set of coils, and a coil of the third set of coils that is closest to the second set of coils is also spaced the third pitch from the second set of coils.

6. The method of claim 5, wherein the first pitch and/or the third pitch are a multiple of the second pitch.

7. The method of claim 5, wherein the first pitch and/or the third pitch are between 1.2 times the second pitch and 12 times the second pitch.

8. A multi-phase linear induction motor (LIM) comprising:
a primary core extending longitudinally and having a front portion and a rear portion; and
coils mounted on the primary core, the coils comprising a first set of coils, a second set of coils, and a third set of coils;
the first set of coils including coils of each phase of the multi-phase LIM being mounted on the front portion of the primary core, wherein adjacent coils of the first set of coils are all spaced apart from each other by a first pitch which is constant along the first set of coils,
the second set of coils including coils of each phase of the multi-phase LIM being mounted on the primary core between the first set of coils and the rear portion, the coils of the second set of coils being spaced apart from each other by a second pitch; and
the third set of coils including coils of each phase of the multi-phase LIM being mounted on the rear portion, wherein adjacent coils of the third set of coils are all spaced apart from each other by a third pitch which is constant along the third set of coils;
wherein the first pitch is greater than the second pitch for reducing an end effect onto the primary core when the primary core travels forward, wherein the third pitch of the third set of coils is greater than the second pitch of the second set of coils for reducing the end effect onto the primary core when the primary core travels backward, wherein the primary core comprises slots at a surface thereof for mounting the coils, wherein a coil of the first set of coils that is closest to the second set of coils is also spaced the first pitch from the second set of coils, and a coil of the third set of coils that is closest to the second set of coils is also spaced the third pitch from the second set of coils.

9. The multi-phase LIM of claim 8, wherein the first pitch is a multiple of the second pitch.

10. The multi-phase LIM of claim 8, wherein the first pitch is between 1.2 times the second pitch and 12 times the second pitch.

11. The multi-phase LIM of claim 3, wherein a difference between (1) the second pitch (ds) and (2) the first pitch and/or the third pitch (dx) is one of:
dx is between 1.2 (ds) and 4 (ds);
dx is between 1.5 (ds) and 4 (ds); and
dx is about 2 (ds).

12. The method of claim 7, wherein a difference between (1) the second pitch (ds) and (2) the first pitch and/or the third pitch (dx) is one of:
dx is between 1.2 (ds) and 4 (ds);
dx is between 1.5 (ds) and 4 (ds); and
dx is about 2 (ds).

13. The multi-phase LIM of claim 10, wherein a difference between (1) the second pitch (ds) and (2) the first pitch and/or the third pitch (dx) is one of:
dx is between 1.2 (ds) and 4 (ds);
dx is between 1.5 (ds) and 4 (ds); and
dx is about 2 (ds).

* * * * *